(12) United States Patent
Kim

(10) Patent No.: US 12,544,962 B2
(45) Date of Patent: Feb. 10, 2026

(54) ALUMINUM PROFILE INJECTION BONDING METHOD

(71) Applicant: Byungchan Kim, Busan (KR)

(72) Inventor: Byungchan Kim, Busan (KR)

( * ) Notice: Subject to any disclaimer, the term of this patent is extended or adjusted under 35 U.S.C. 154(b) by 106 days.

(21) Appl. No.: 18/428,696

(22) Filed: Jan. 31, 2024

(65) Prior Publication Data

US 2024/0351253 A1     Oct. 24, 2024

(30) Foreign Application Priority Data

Apr. 21, 2023   (KR) .......................... 10-2023-0052787

(51) Int. Cl.
  *B29C 45/14*    (2006.01)
  *B29C 65/00*    (2006.01)

(52) U.S. Cl.
  CPC .. *B29C 45/14467* (2013.01); *B29C 66/52231* (2013.01); *B29C 66/61* (2013.01); *B29C 2045/14967* (2013.01)

(58) Field of Classification Search
  CPC .................... B29C 45/14467; B29C 45/14967
  See application file for complete search history.

(56) References Cited

U.S. PATENT DOCUMENTS

| | | | | |
|---|---|---|---|---|
| 5,128,085 A | * | 7/1992 | Post .......................... | B60B 7/068 |
| | | | | 264/254 |
| 6,365,086 B1 | * | 4/2002 | Schoonover ...... | B29C 45/14467 |
| | | | | 264/261 |
| 8,652,382 B2 | * | 2/2014 | Eggert .............. | B29C 45/14467 |
| | | | | 264/261 |
| 9,085,107 B2 | * | 7/2015 | Wittenberg ......... | B29C 45/2806 |
| 10,689,899 B2 | * | 6/2020 | Koster ...................... | E06B 3/12 |

FOREIGN PATENT DOCUMENTS

| | | |
|---|---|---|
| DE | 2235791 A1 | 1/1974 |
| DE | 2444267 A1 | 4/1975 |
| DE | 4040048 A1 | 6/1991 |
| DE | 102009052110 A1 | 5/2011 |
| DE | 102010036641 A1 | 6/2011 |
| DE | 102017010863 A1 | 5/2019 |
| JP | 07-144267 A | 6/1995 |
| JP | 11-507609 * | 7/1999 |
| KR | 10-1277453 B1 | 6/2013 |

OTHER PUBLICATIONS

Communication dated Feb. 18, 2025 issued by the German Patent Office in application No. 10202410930.7.

* cited by examiner

*Primary Examiner* — Edmund H Lee
(74) *Attorney, Agent, or Firm* — Sughrue Mion, PLLC

(57) ABSTRACT

An aluminum profile injection bonding method including a product preparation operation of manufacturing a plurality of aluminum profiles to be bonded in accordance with a product design, a mold preparation operation of manufacturing a mold designed in accordance with the aluminum profiles prepared through the product preparation operation, a seating operation of seating the plurality of aluminum profiles to be bonded in the mold in a state of being in contact with each other, and an injection filling operation of constructing the aluminum profiles to be bonded in an integrated form by filling contact portions of the aluminum profiles with an injection molded material through the mold.

1 Claim, 9 Drawing Sheets

<RELATED ART>

ALUMINUM PROFILE INJECTION BONDING METHOD

CROSS-REFERENCE TO RELATED APPLICATION

This application claims priority to and the benefit of Korean Patent Application No. 10-2023-0052787, filed on Apr. 21, 2023, the disclosure of which is incorporated herein by reference in its entirety.

BACKGROUND

1. Field of the Invention

The present invention relates to an aluminum profile injection bonding method, and more particularly, to a profile injection bonding method for an electric vehicle battery housing.

2. Discussion of Related Art

The present invention relates to a method of bonding a plurality of aluminum profiles constituting an electric vehicle battery housing, and is intended to solve the problems of a bonding method by welding according to the related art.

In the case of the boding method by welding according to the related art, there is a problem in that an aluminum profile is deformed after welding. Specifically, since the aluminum profile has a property of being deformed by heat of 500 to 600 degrees Celsius, the aluminum profile is subjected to thermal deformation due to the heat generated during welding.

For this reason, in order to manufacture a desired structure by welding a plurality of aluminum profiles, a plurality of deformation prevention members and a plurality of additional processes after welding are required to prevent welding deformation. Consequently, the bonding method using welding according to the related art has a problem that it is very difficult to accurately meet tolerances such as flatness and hole positions. In addition, a weld bead line interferes with an attachment portion, and thus weld beads have to be removed through grinding, which causes problems of requiring an additional process, making flatness difficult to achieve, and having a very high risk of leakage.

In addition, in the case of the bonding method by welding according to the related art, it is very difficult to rework after discovering a welding defect, and thus there is a problem that a product with the welding defect has to be discarded.

Therefore, there is a need for technology capable of solving the problems caused by the related art mentioned above, simplifying the process of the bonding method according to the related art, preventing deformation of products, and fundamentally blocking the risk of leakage.

Examples of the related art include Korean Patent Registration No. 10-1277453 (registered on Jun. 17, 2013).

SUMMARY OF THE INVENTION

The present invention is directed to providing providing an aluminum profile injection bonding method capable of easily bonding aluminum profiles with various cross-sectional structures, maintaining a stable bonding state and thus omitting a plurality of bonding or binding members, thereby significantly reducing costs required in manufacturing and construction, and in addition, significantly shortening a construction time, in the manufacture of an electric vehicle battery housing.

According to an aspect of the present invention, there is provided an aluminum profile injection bonding method including a product preparation operation of manufacturing a plurality of aluminum profiles to be bonded in accordance with a product design, a mold preparation operation of manufacturing a mold designed in accordance with the aluminum profiles prepared through the product preparation operation, a seating operation of seating the plurality of aluminum profiles to be bonded in the mold in a state of being in contact with each other, and an injection filling operation of constructing the aluminum profiles to be bonded in an integrated form by filling contact portions of the aluminum profiles with an injection molded material through the mold.

In the aspect of the present invention, the mold preparation operation may include a mold gate forming operation of forming a mold gate having a structure that allows the injection molded material to be discharged through the mold and guided into an aluminum profile bonding portion in accordance with a formation position of a filling hole of each of the aluminum profiles.

In the aspect of the present invention, the injection filling operation may include a side through-hole forming operation of guiding the injection molded material to be bound to the aluminum profiles in an integrated form by machining a through-hole in a side surface of each of the aluminum profiles.

In the aspect of the present invention, the injection filling operation may include a pin inserting operation of binding the injection molded material to the aluminum profiles in the integrated form by inserting a pin into the through-hole formed through the side through-hole forming operation.

In the aspect of the present invention, the injection filling operation may include a block mounting operation of mounting a block inside the aluminum profiles to form a space of a predetermined volume adjacent to a bonding portion inside each of the aluminum profiles.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, preferred embodiments of the present invention will be described in detail with reference to the drawings. Prior to the description, it should be understood that the terms or words used in the present specification and appended claims should not be construed as being limited to general or dictionary meanings, but interpreted based on meanings and concepts corresponding to the technical aspects of the present invention.

In the entire specification, when a member is said to be located "on" another member, this includes not only a case where a member is in contact with another member, but also a case where another member exists between the two members. In the entire specification, when a part "includes" or "comprises" a component, unless described to the contrary, the term "includes" or "comprises" does not indicate that the part excludes another component but instead indicates that the part may further include the other component.

Figure 1:
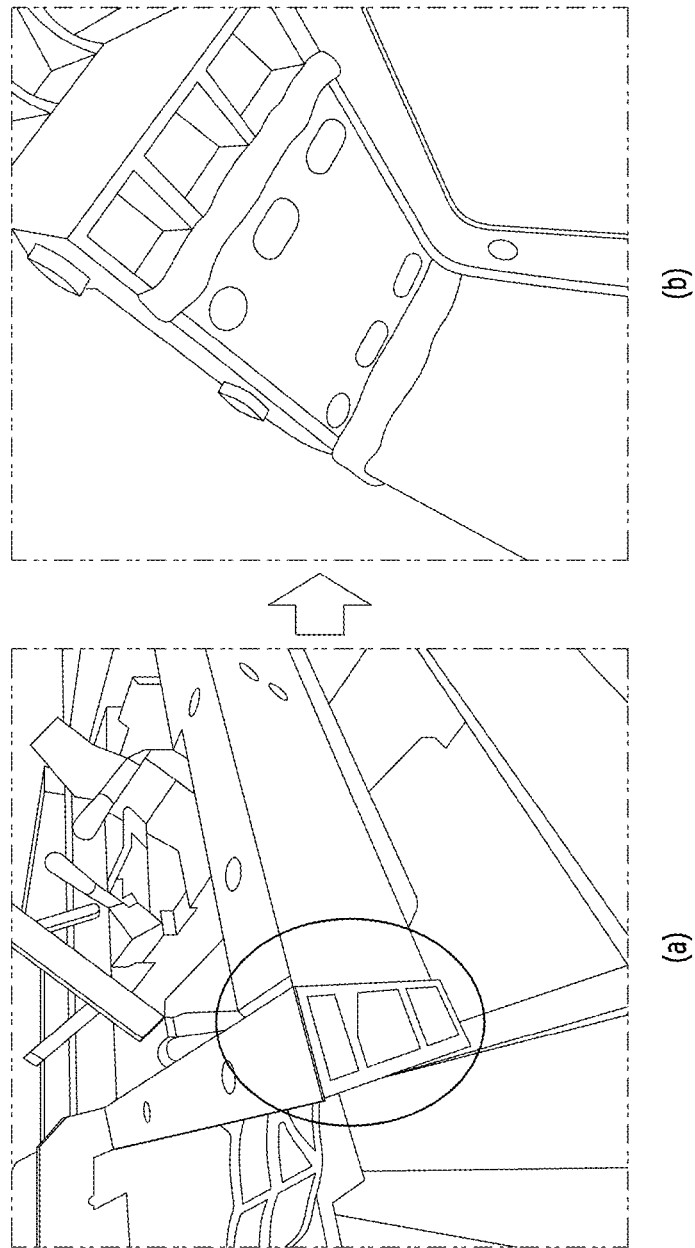
FIG. 1 is a photograph showing an aluminum profile bonding process according to the related art.
Figure 2:
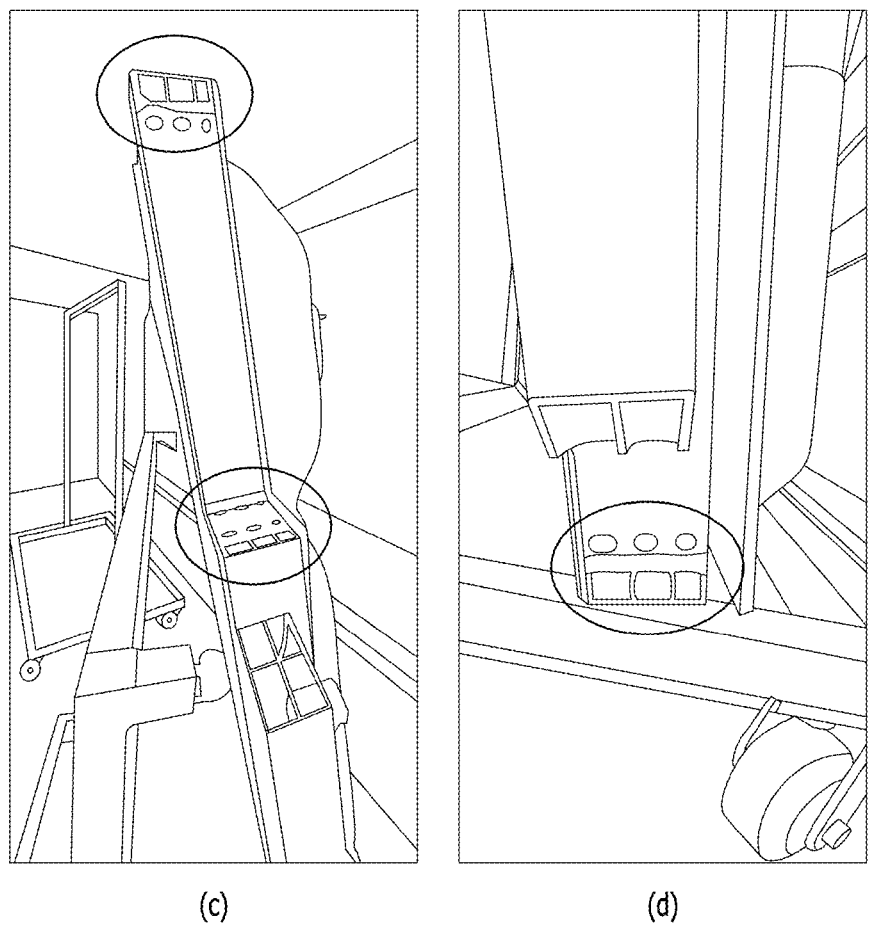
FIG. 2 is a photograph showing a state of aluminum profiles bonded by a welding method according to the related art.
Figure 3:
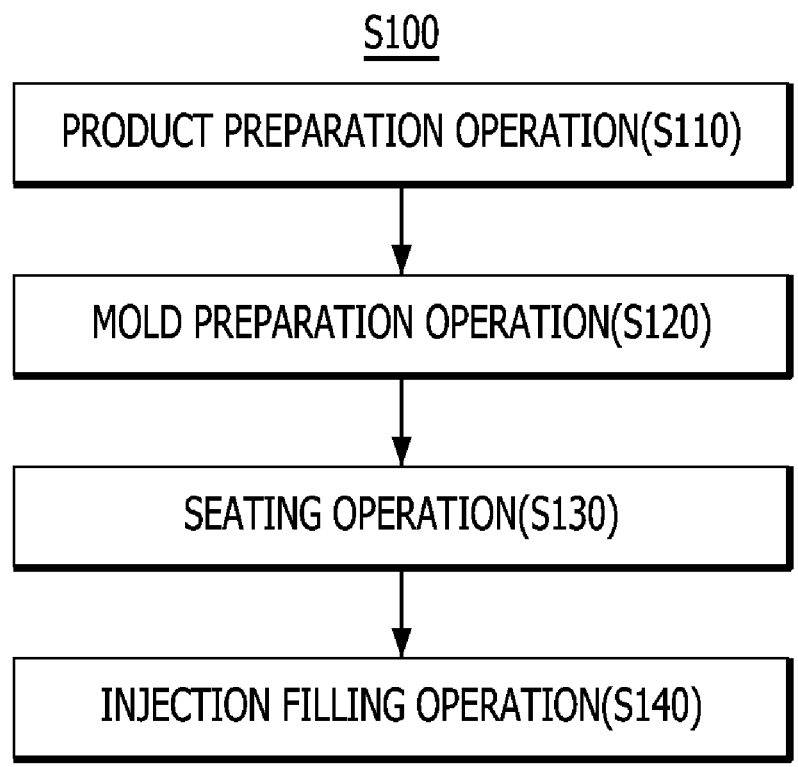
FIG. 3 is a flowchart showing an aluminum profile bonding method according to one embodiment of the present invention.

FIG. 3 is a flowchart showing an aluminum profile bonding method according to one embodiment of the present invention.

Referring to FIG. 3, since an aluminum profile bonding method (S100) according to the present embodiment includes a product preparation operation (S110), a mold preparation operation (S120), a seating operation (S130), and an injection filling operation (S140), each of which performs a specific process, the aluminum profile injection bonding method capable of easily bonding aluminum profiles with various cross-sectional structures, maintaining a stable bonding state and thus omitting a plurality of bonding or binding members, thereby significantly reducing costs required in manufacturing and construction, and in addition, significantly shortening a construction time, in the manufacture of an electric vehicle battery housing may be provided.

Hereinafter, each operation constituting the aluminum profile injection bonding method (S100) according to the present embodiment will be described in detail with reference to the drawings.

Figure 4:
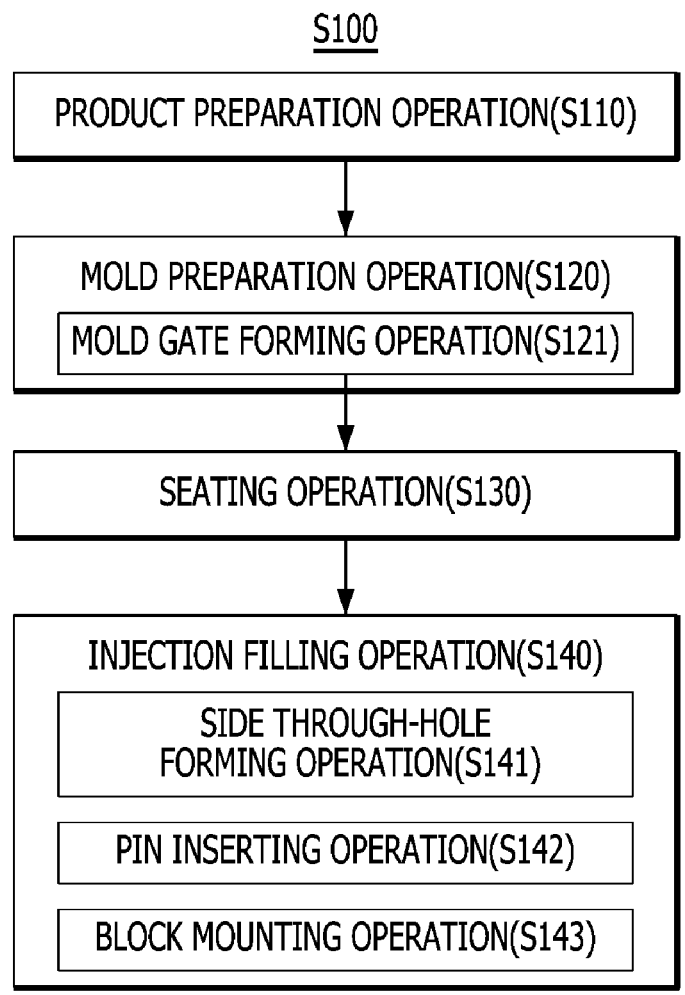
FIG. 4 is a flowchart showing an aluminum profile bonding method according to another embodiment of the present invention.
Figure 5:
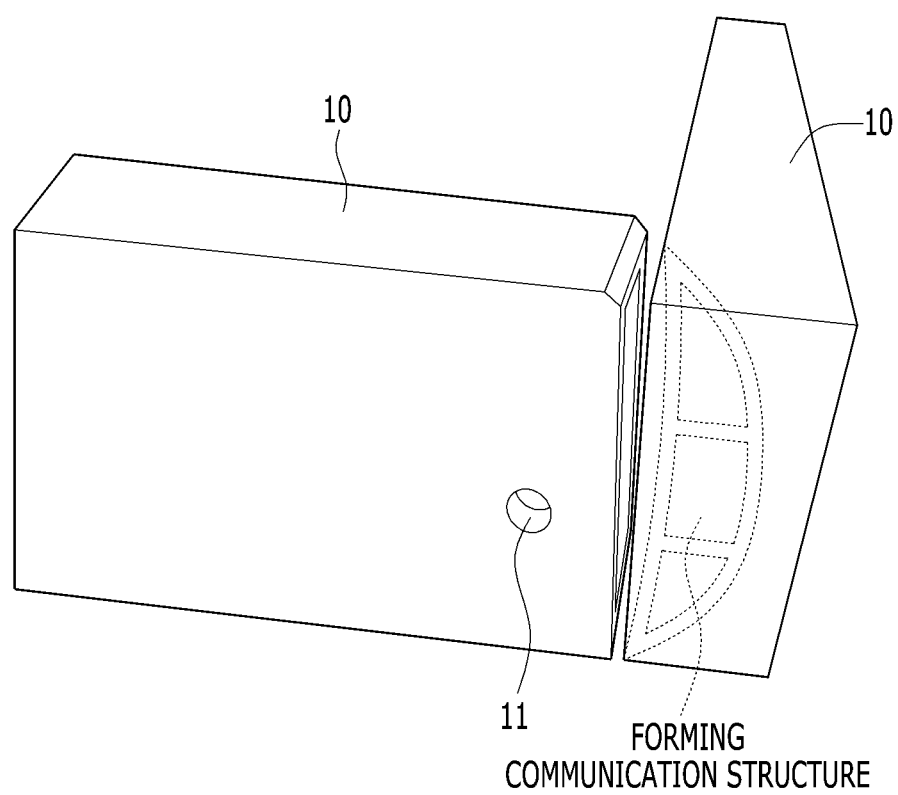
FIG. 5 is a perspective view showing an example in which a filling hole is formed in a state in which two aluminum profiles to be bonded are in contact with each other.
Figure 6:
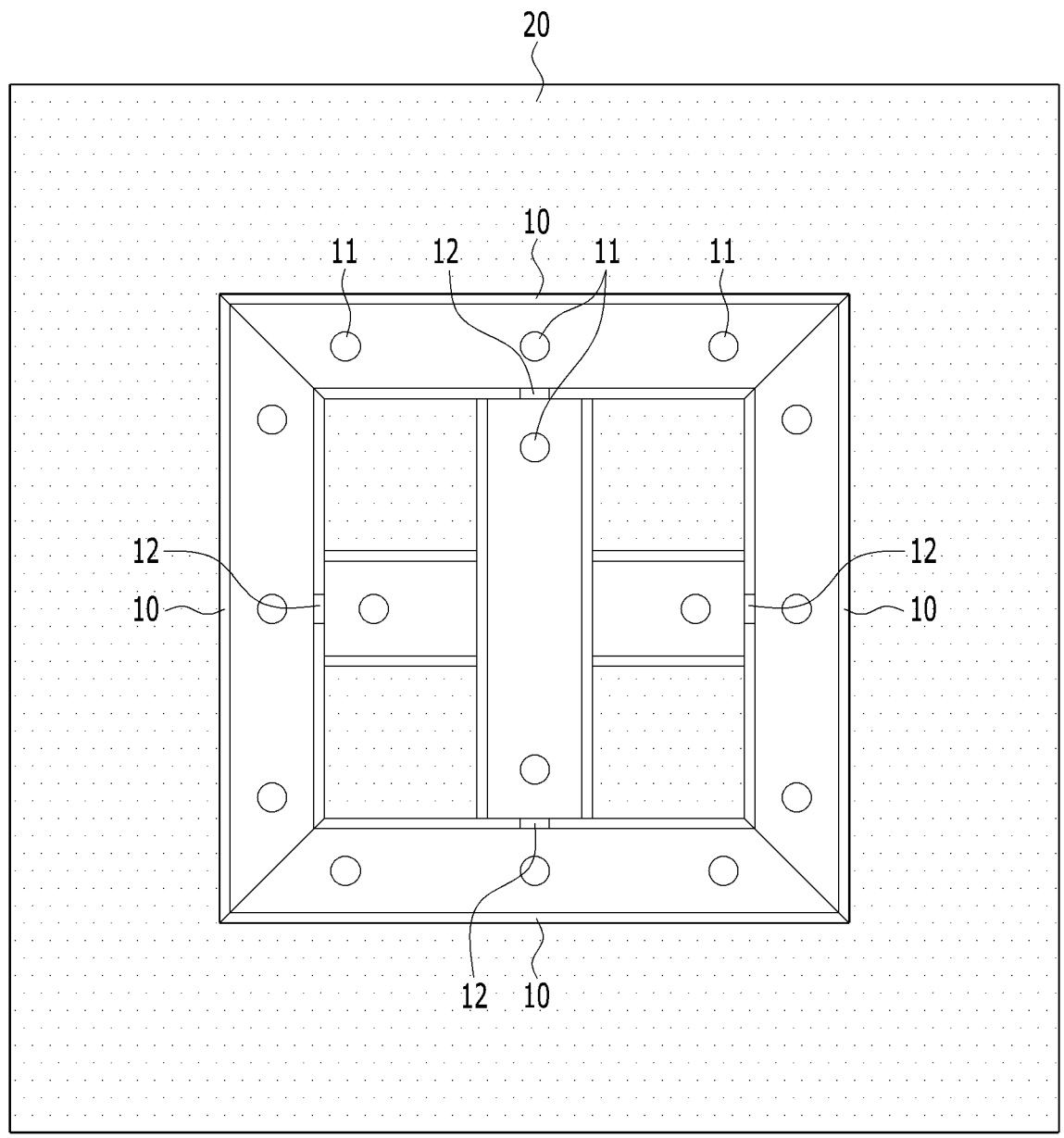
FIG. 6 is a plan schematic diagram showing a state in which a plurality of aluminum profiles contacting each other are seated in a mold as shown in FIG. 5.
Figure 7:
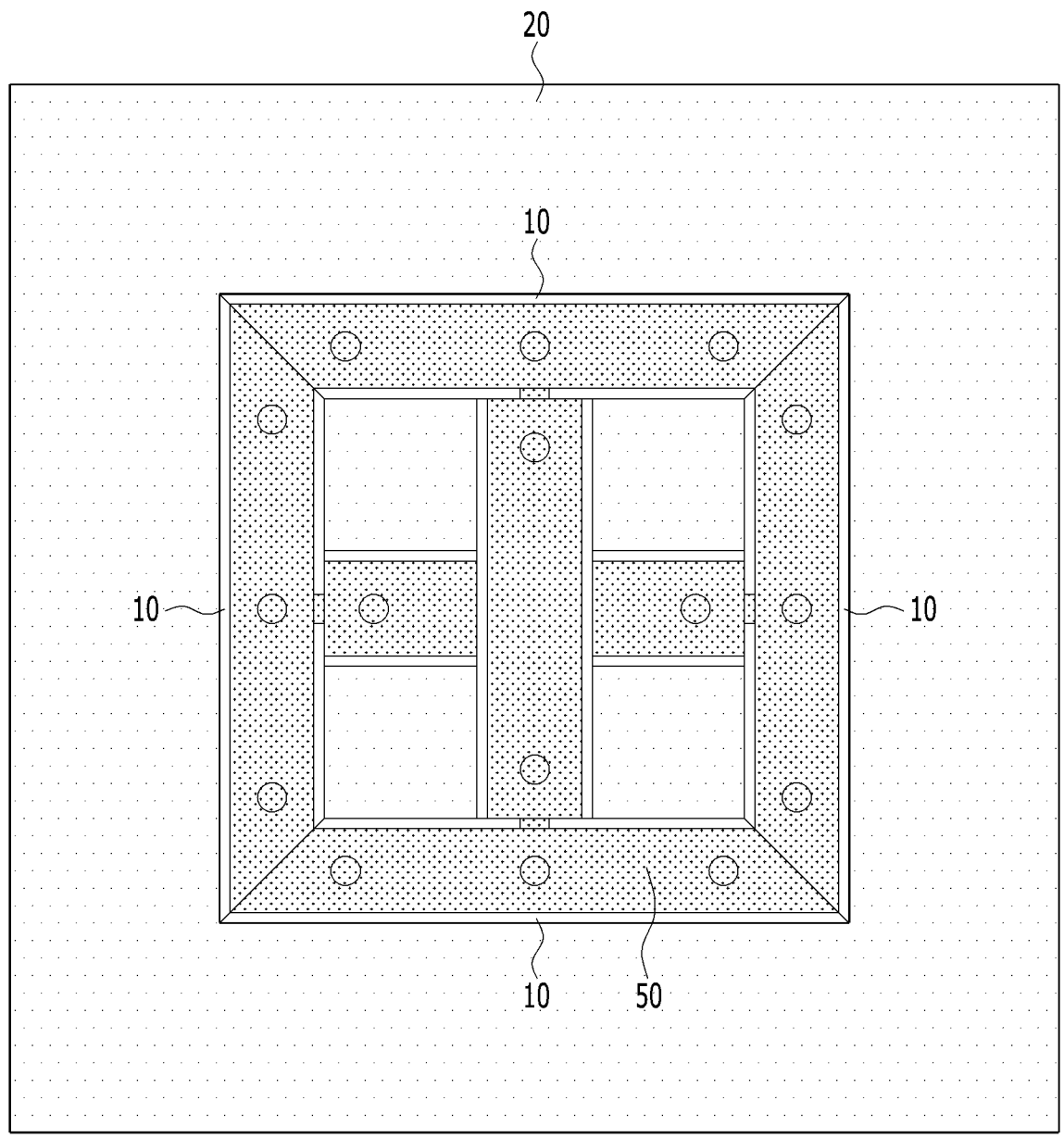
FIG. 7 is a plan schematic diagram showing a state in which interiors of the aluminum profiles are filled with an injection molded material from the mold shown in FIG. 6.
Figure 8:
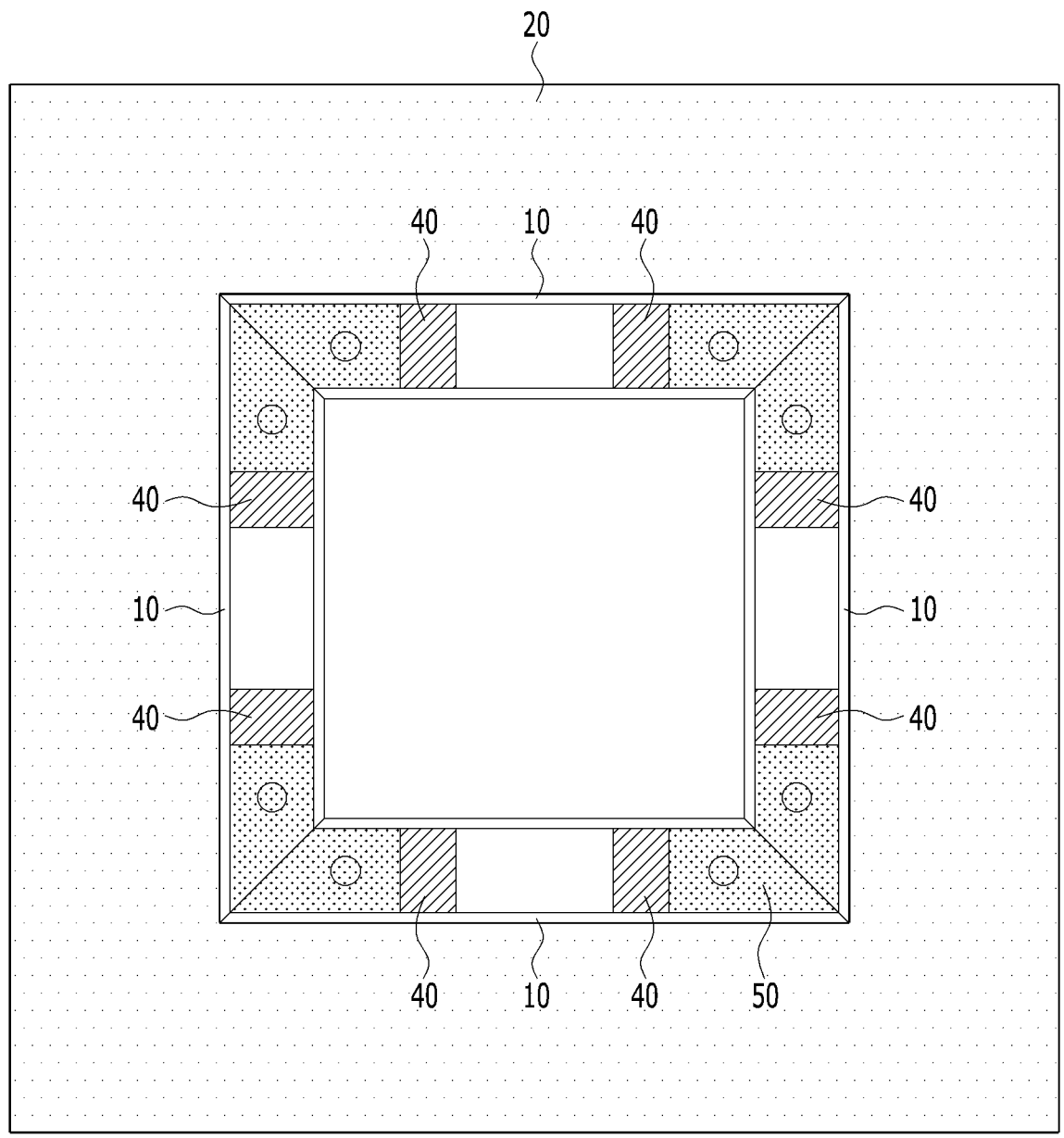
FIG. 8 is a plan schematic diagram showing a state in which the interiors of the aluminum profiles are filled with the injection molded material from a mold in a state in which blocks are inserted into the aluminum profiles.
Figure 9:
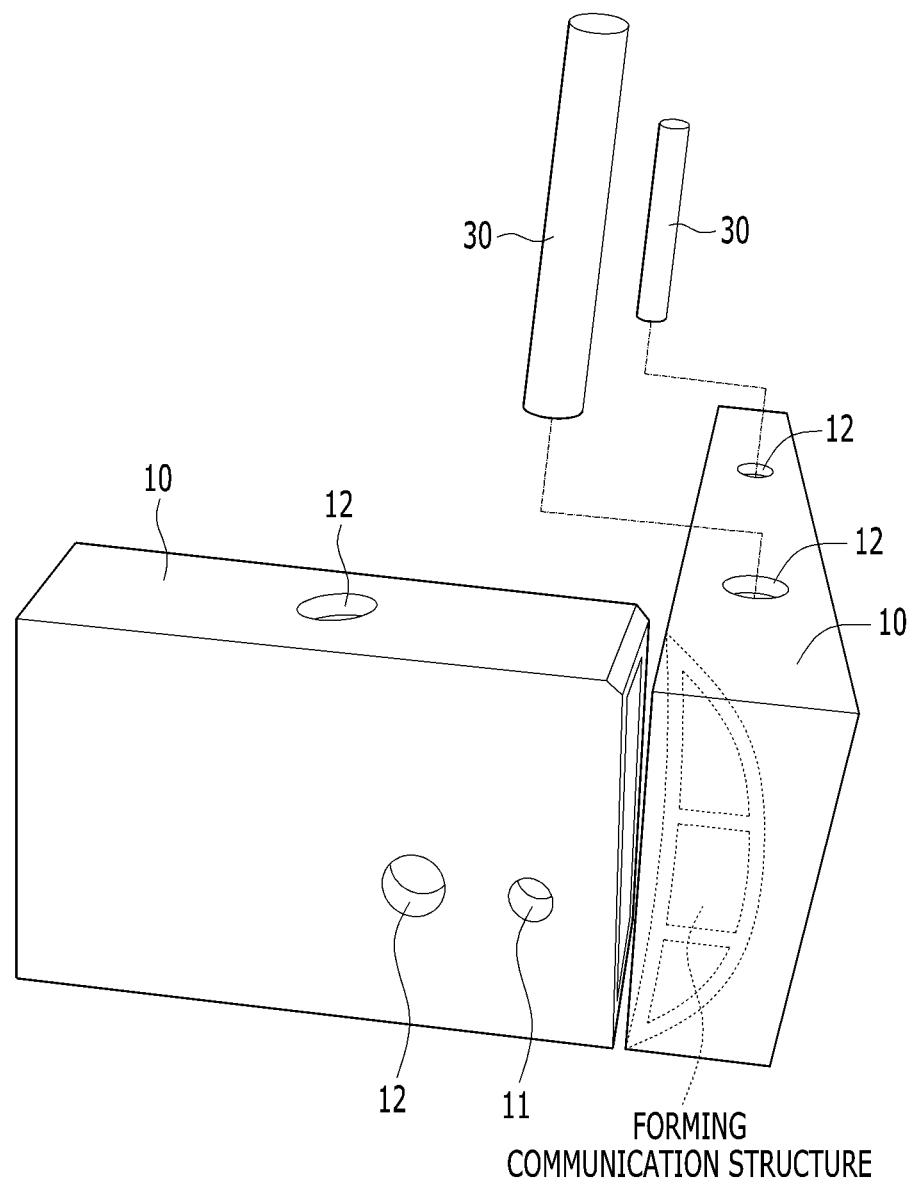
FIG. 9 is a perspective view showing an example of inserting a pin after forming a through-hole in an aluminum profile.

FIG. 4 is a flowchart showing an aluminum profile bonding method according to another embodiment of the present invention, and FIG. 5 is a perspective view showing an example in which a filling hole is formed in a state in which two aluminum profiles to be bonded are in contact with each other. FIG. 6 is a plan schematic diagram showing a state in which a plurality of aluminum profiles contacting each other are seated in a mold as shown in FIG. 5, FIG. 7 is a plan schematic diagram showing a state in which interiors of the aluminum profiles are filled with an injection molded material from the mold shown in FIG. 6, and FIG. 8 is a plan schematic diagram showing a state in which the interiors of the aluminum profiles are filled with the injection molded material in a state in which blocks are inserted into the aluminum profiles. In addition, FIG. 9 is a perspective view showing an example of inserting a pin after forming a through-hole in an aluminum profile.

The product preparation operation (S110) according to the present embodiment performs a process of manufacturing a plurality of aluminum profiles to be bonded in accordance with a product design.

The mold preparation operation (S120) according to the present embodiment performs a process of manufacturing a mold designed in accordance with the aluminum profiles prepared through the product preparation operation (S110).

Specifically, the mold preparation operation (S120) may include a mold gate forming operation (S121), a side through-hole forming operation (S141), a pin inserting operation (S142), and a block mounting operation (S143), each of which performs a specific process. The mold gate forming operation (S121) of the mold preparation operation (S120) performs a process of forming a mold gate having a structure that allows the injection molded material to be discharged through the mold and guided into an aluminum profile bonding portion in accordance with a formation position of a filling hole of each of the aluminum profiles. As shown in FIG. 6 and FIG. 9, the side through-hole forming operation (S141) performs a process of guiding the injection molded material to be bound to the aluminum profiles in an integrated form by machining a through-hole 12 in a side surface of each of the aluminum profiles. As shown in FIG. 9, the pin inserting operation (S142) performs a process of binding the injection molded material to the aluminum profiles in the integrated form by inserting a pin 30 into the through-hole formed through the side through-hole forming operation (S141). As shown in FIG. 8, the block mounting operation (S143) performs a process of mounting a block 40 inside the aluminum profiles to form a space of a predetermined volume adjacent to a bonding portion inside each of the aluminum profiles.

The seating operation (S130) according to the present embodiment performs a process of manufacturing a mold designed in accordance with the aluminum profiles prepared through the product preparation operation (S110).

The injection filling operation (S140) according to the present embodiment performs a process of constructing the aluminum profiles to be bonded in an integrated form by filling contact portions of the aluminum profiles with an injection molded material through the mold.

As described above, according to the aluminum profile injection bonding method of the present invention, by including the product preparation operation (S110), the mold preparation operation (S120), the seating operation (S130), and the injection filling operation (S140), each of which performs a specific process, the aluminum profile injection bonding method (S100) capable of easily bonding aluminum profiles with various cross-sectional structures, maintaining a stable bonding state and thus omitting a plurality of bonding or binding members, thereby significantly reducing costs required in manufacturing and construction, and in addition, significantly shortening a construction time, in the manufacture of an electric vehicle battery housing, may be provided.

As described above, according to an aluminum profile injection bonding method of the present invention, by including a product preparation operation, a mold preparation operation, a seating operation, and an injection filling operation, each of which performs a specific process, the aluminum profile injection bonding method capable of easily bonding aluminum profiles with various cross-sectional structures, maintaining a stable bonding state and thus omitting a plurality of bonding or binding members, thereby significantly reducing costs required in manufacturing and construction, and in addition, significantly shortening a construction time, in the manufacture of an electric vehicle battery housing, can be provided.

In the above detailed description of the present invention, only special embodiments thereof have been described. However, it should be understood that the present invention is not limited to the special forms mentioned in the detailed description, but rather is understood that the present invention includes all modifications, equivalents, and substitutes within the spirit and scope of the present invention as defined by the appended claims.

That is, the present invention is not limited to the particular embodiments and descriptions described above, and various modifications to the present invention can be made by anyone skilled in the art without departing from the subject matter of the present invention as claimed in the claims, and such modifications are within the scope of protection of the present invention.

What is claimed is:

1. A method for manufacturing an electric vehicle battery housing including a plurality of aluminum profiles, the method comprising:

implementing a joined state of the electric vehicle battery housing by joining the plurality of aluminum profiles having different cross-sectional structures, and the implementing the joined state of the electric vehicle battery housing by joining the plurality of aluminum profiles having different cross-sectional structures, comprising:

a product preparation operation (S110) of manufacturing a plurality of aluminum profiles to be bonded in accordance with a product design;

a mold preparation operation (S120) of manufacturing a mold designed in accordance with the aluminum profiles prepared through the product preparation operation (S110);

a seating operation (S130) of seating the plurality of aluminum profiles to be bonded in the mold in a state of being in contact with each other; and an injection filling operation (S140) of constructing the aluminum profiles to be bonded in an integrated form by filling contact portions of the aluminum profiles with an injection molded material through the mold, wherein the mold preparation operation (S120) includes a mold gate forming operation (S121) of forming a mold gate having a structure that allows the injection molded material to be discharged through the mold and guided into an aluminum profile bonding portion in accordance with a formation position of a filling hole of each of the aluminum profiles, wherein the injection filling operation (S140) includes a side through-hole forming operation (S141) of guiding the injection molded material to be bound to the aluminum profiles in an integrated form by machining a through-hole (12) in a side surface of each of the aluminum profiles, wherein the injection filling operation (S140) includes a pin inserting operation (S142) of binding the injection molded material to the aluminum profiles in the integrated form by inserting a pin (30) into the through-hole formed through the side through-hole forming operation (S141), and wherein the injection filling operation (S140) includes a block mounting operation (S143) of mounting a block (40) inside the aluminum profiles to form a space of a predetermined volume adjacent to a bonding portion inside each of the aluminum profiles.

\* \* \* \* \*